(12) United States Patent
Yotsumoto et al.

(10) Patent No.: US 12,325,820 B2
(45) Date of Patent: Jun. 10, 2025

(54) USE OF COMPOSITION IN DEVICE, DEVICE, AND REFRIGERATION CYCLE APPARATUS

(71) Applicant: DAIKIN INDUSTRIES, LTD., Osaka (JP)

(72) Inventors: Yuuki Yotsumoto, Osaka (JP); Takashi Usui, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 180 days.

(21) Appl. No.: 18/103,049

(22) Filed: Jan. 30, 2023

(65) Prior Publication Data

US 2023/0167345 A1 Jun. 1, 2023

Related U.S. Application Data

(63) Continuation of application No. PCT/JP2021/028147, filed on Jul. 29, 2021.

(30) Foreign Application Priority Data

Jul. 31, 2020 (JP) .................................. 2020-131013

(51) Int. Cl.
*C09K 5/04* (2006.01)
(52) U.S. Cl.
CPC ........ *C09K 5/045* (2013.01); *C09K 2205/126* (2013.01); *C09K 2205/128* (2013.01); *C09K 2205/22* (2013.01)

(58) Field of Classification Search
CPC .............. C09K 5/045; C09K 2205/126; C09K 2205/128; C09K 2205/22; F25B 13/00; F25B 2400/121
See application file for complete search history.

(56) References Cited

U.S. PATENT DOCUMENTS

| 4,479,534 A | 10/1984 | Rhodes |
| 2016/0200955 A1 | 7/2016 | Ueda et al. |

(Continued)

FOREIGN PATENT DOCUMENTS

| JP | 58-150794 A | 9/1983 |
| JP | 2010267912 A * | 11/2010 |

(Continued)

OTHER PUBLICATIONS

Tetsuo et al, Analysis of disproportionation process of trifluoroethylene mixture, Elsevier Ltd., Journal of loss prevention in the industries 54 (2018) 179-182 (Year: 2018).*

(Continued)

*Primary Examiner* — Emmanuel E Duke
(74) *Attorney, Agent, or Firm* — Birch, Stewart, Kolasch & Birch, LLP

(57) ABSTRACT

The propagation of a disproportionation reaction of a refrigerant is suppressed. Disclosed is a method that uses a composition in a device, in which the composition includes one or more compounds selected from the group of ethylene-based fluoroolefins, 2,3,3,3-tetrafluoropropene, and 1,3,3,3-tetrafluoropropene, and the heat capacity of a portion with a melting point greater than or equal to 1,000° C. in the device is greater than or equal to 6.5 J/K.

5 Claims, 2 Drawing Sheets

(56) References Cited

U.S. PATENT DOCUMENTS

| | | | |
|---|---|---|---|
| 2016/0201958 A1* | 7/2016 | Ueda | C09K 5/044 62/474 |
| 2016/0369147 A1* | 12/2016 | Fukushima | C09K 5/04 |
| 2021/0163381 A1 | 6/2021 | Komatsu | |

FOREIGN PATENT DOCUMENTS

| | | | | |
|---|---|---|---|---|
| JP | 2012-255640 A | | 12/2012 | |
| JP | 2015-83899 A | | 4/2015 | |
| JP | 2016-140946 A | | 8/2015 | |
| JP | 2015140946 A | * | 8/2015 | Y02E 60/14 |
| JP | 2019-196312 A | | 11/2019 | |
| JP | 2020-38014 A | | 3/2020 | |
| WO | WO-2017199516 A1 | * | 11/2017 | C09K 5/045 |

OTHER PUBLICATIONS

International Search Report, issued in PCT/JP2021/028147, PCT/ISA/210, dated Sep. 7, 2021.
Written Opinion of the International Searching Authority, issued in PCT/JP2021/028147, PCT/ISA/237, dated Sep. 7, 2021.
Extended European Search Report for European Application No. 21851130.1, dated Jul. 31, 2024.
International Preliminary Report on Patentability and English translation of the Written Opinion of the International Searching Authority dated Feb. 9, 2023 for Application No. PCT/JP2021/028147.

* cited by examiner

USE OF COMPOSITION IN DEVICE, DEVICE, AND REFRIGERATION CYCLE APPARATUS

CROSS REFERENCE TO RELATED APPLICATIONS

This application is a Continuation of PCT International Application No. PCT/JP2021/028147, filed on Jul. 29, 2021, which claims priority under 35 U.S.C. 119(a) to Patent Application No. JP 2020-131013, filed in Japan on Jul. 31, 2020, all of which are hereby expressly incorporated by reference into the present application.

TECHNICAL FIELD

The present disclosure relates to the use of a composition in a device, the device, and a refrigeration cycle apparatus.

BACKGROUND ART

Conventionally, hydrofluoroolefins (HFO refrigerants) having lower global warming potential (hereinafter also simply referred to as GWP) than HFC refrigerants have attracted attention for refrigeration apparatuses. For example, in Patent Literature 1 (Japanese Patent Laid-Open No. 2019-196312), 1,2-difluoroethylene (HFO-1132) and the like are considered as refrigerants with low GWP.

SUMMARY

The use according to a first aspect is the use of a composition in a device, in which the composition includes one or more compounds selected from the group consisting of ethylene-based fluoroolefins, 2,3,3,3-tetrafluoropropene (HFO-1234yf), and 1,3,3,3-tetrafluoropropene (HFO-1234ze). In the device, the heat capacity of a portion with a melting point greater than or equal to 1,000° C. is greater than or equal to 6.5 J/K.

DESCRIPTION OF EMBODIMENTS

Figure 1:
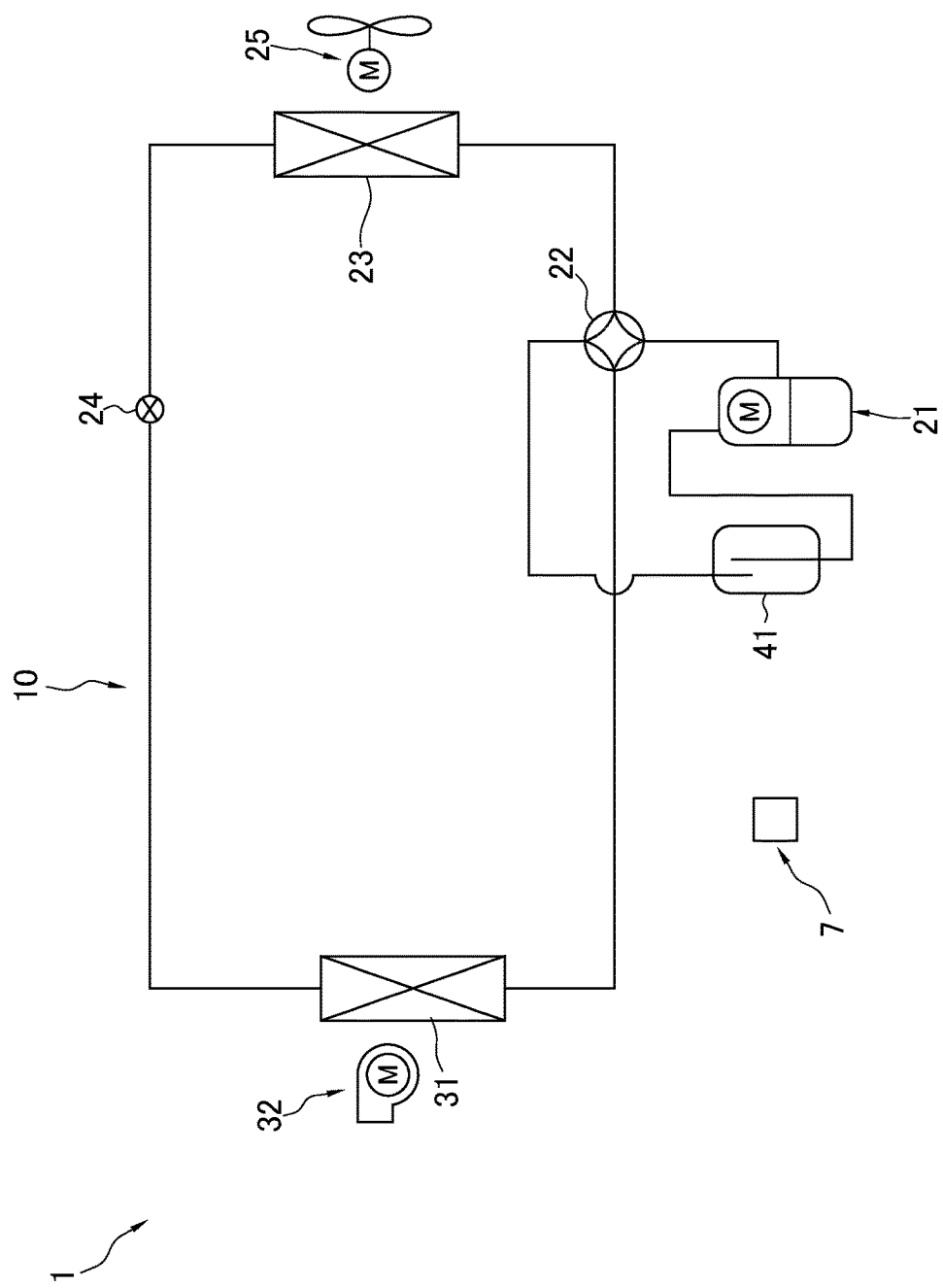
FIG. 1 is a schematic configuration diagram of a refrigeration cycle apparatus.

Hereinafter, the use of a composition in a device, the device, and a refrigeration cycle apparatus according to the present disclosure will be specifically described with reference to examples. However, the following description is not intended to limit the present disclosure.

The use of a composition in a device according to the present disclosure is the use of a composition, which includes one or more compounds selected from the group consisting of ethylene-based fluoroolefins and 2,3,3,3-tetrafluoropropene (HFO-1234yf), in a device. In the device, the heat capacity of a portion with a melting point greater than or equal to 1,000° C. is greater than or equal to 6.5 J/K.

The composition includes one or more compounds selected from the group consisting of ethylene-based fluoroolefins, 2,3,3,3-tetrafluoropropene (HFO-1234yf), and 1,3,3,3-tetrafluoropropene (HFO-1234ze). Note that regarding the burning velocity defined by the ISO 817, 1,3,3,3-tetrafluoropropene (HFO-1234ze) with a burning velocity of 1.2 cm/s is more preferable than 2,3,3,3-tetrafluoropropene (HFO-1234yf) with a burning velocity of 1.5 cm/s. Regarding the LFL (Lower Flammability Limit) defined by the ISO 817, 1,3,3,3-tetrafluoropropene (HFO-1234ze) with a LFL of 65,000 vol·ppm or 6.5% is more preferable than 2,3,3,3-tetrafluoropropene (HFO-1234yf) with a LFL of 62,000 vol·ppm or 6.2%. In particular, the composition may include one or more compounds selected from the group consisting of 1,2-difluoroethylene (HFO-1132), 1,1-difluoroethylene (HFO-1132a), 1,1,2-trifluoroethylene (HFO-1123), monofluoroethylene (HFO-1141), and perhaloolefins. Above all, the composition may be preferable to include 1,2-difluoroethylene (HFO-1132) and/or 1,1,2-trifluoroethylene (HFO-1123).

Herein, examples of ethylene-based fluoroolefins include 1,2-difluoroethylene (HFO-1132), 1,1-difluoroethylene (HFO-1132a), 1,1,2-trifluoroethylene (HFO-1123), monofluoroethylene (HFO-1141), and perhaloolefins. Examples of perhaloolefins include chlorotrifluoroethylene (CFO-1113) and tetrafluoroethylene (FO-1114).

Such compositions can undergo a disproportionation reaction under a condition where a predetermined high-temperature condition, high-pressure condition, and ignition energy condition are satisfied, for example. However, according to the present disclosure, even when a disproportionation reaction has occurred, the propagation of the disproportionation reaction can be suppressed.

The foregoing composition may be used as a refrigerant in the device. In addition, the composition may be used together with refrigerator oil in the device.

The heat capacity of a portion, of the device, with a melting point greater than or equal to 1,000° C. in the device is greater than or equal to 6.5 J/K. The heat capacity of the portion with a melting point greater than or equal to 1,000° C. in the device is preferably greater than or equal to 6.7 J/K. In addition, the heat capacity of a portion with a melting point greater than or equal to 1,200° C. in the device is preferably greater than or equal to 6.5 J/K, and is more preferably greater than or equal to 6.7 J/K. Further, the heat capacity of a portion with a melting point greater than or equal to 1,400° C. in the device is preferably greater than or equal to 6.5 J/K, and is more preferably greater than or equal to 6.7 J/K. As the portion with a heat capacity greater than or equal to 6.5 J/K in the device has a melting point greater than or equal to 1,000° C., the melting of the portion is suppressed even when a disproportionation reaction has occurred. In addition, as the device has such a heat capacity, it is considered that even when a disproportionation reaction has occurred in the device, the portion with the high heat capacity absorbs the generated heat so that a rapid increase in temperature is suppressed. Thus, the propagation of the generated disproportionation reaction can be suppressed.

The portion with a heat capacity greater than or equal to 6.5 J/K in the device is preferably a portion that the composition contacts when used. The portion with a heat capacity greater than or equal to 6.5 J/K in the device may be a single member or an aggregate of a plurality of members. The portion with a heat capacity greater than or equal to 6.5 J/K in the device is preferably made of metal, for example.

Such a device is not limited, and may be a transport pipe for transporting the foregoing composition, or may be a device including a movable portion and/or an electric portion, for example. The device including a movable portion and/or an electric portion may be a compressor or a control valve, such as an expansion valve or an on-off valve, used for a refrigeration cycle apparatus, for example. In such a device including a movable portion, a disproportionation reaction is likely to occur due to frictional heat of the movable portion, and in such a device including an electric portion, a disproportionation reaction is likely to occur due to electric energy of the electric portion. However, the propagation of the thus generated disproportionation reaction can be suppressed. A refrigeration cycle apparatus including such a compressor or a control valve may be a refrigeration cycle apparatus 1 illustrated in FIG. 1, for example. The refrigeration cycle apparatus 1 includes a refrigerant circuit 10, which includes a compressor 21, a receiver 41, a four-way switching valve 22, an outdoor heat exchanger 23, an expansion valve 24, and an indoor heat exchanger 31 that are connected via refrigerant pipes; an outdoor fan 25; an indoor fan 32; and a controller 7. The refrigerant circuit 10 is filled with the foregoing composition as a refrigerant, together with refrigerator oil. The controller 7 drives and controls the compressor 21, the expansion valve 24, the outdoor fan 25, and the indoor fan 32 to circulate the refrigerant through the refrigerant circuit 10, thereby performing refrigeration cycles.

The results of a test performed by the inventors demonstrate that according to the use of a composition in a device, the device, and the refrigeration cycle apparatus described above, even when a disproportionation reaction has occurred, the propagation of the generated disproportionation reaction can be suppressed.

Figure 2:
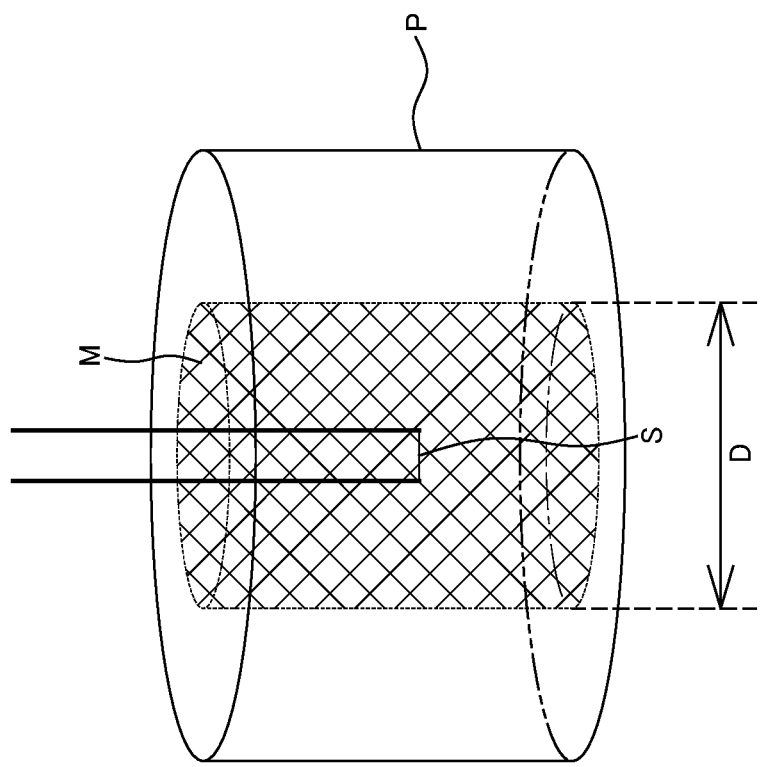
FIG. 2 is a schematic view illustrating an instrument used in a test related to the relationship between the propagation of a disproportionation reaction and a heat capacity.

Specifically, the inventors prepared a test device illustrated in FIG. 2 to cause a disproportionation reaction to occur therein, and observed differences in the propagation of the disproportionation reaction while changing the heat capacity of a mesh member provided around the portion where the disproportionation reaction has occurred, for example. The test device mainly included a pressure-resistant container P, an ignition source S, and a mesh member M. The pressure-resistant container P was a container with a cylindrical internal space. The ignition source S was a platinum wire provided to connect two electrodes in the center of the internal space of the pressure-resistant container P. The mesh member M was a mesh-like member with a cylindrical external profile provided to surround the ignition source S from its outer side in the radial direction. The reason for the use of such a mesh-like member was to perform a test while maintaining the same refrigerant pressure inside and outside the mesh member M. The test device was constructed such that the radial dimension of the internal space of the pressure-resistant container P became sufficiently larger than the radial dimension of the mesh member M. The mesh member M was formed by rolling up a mesh-like sheet into a cylindrical shape. In each test example, the size of each opening of the mesh member M was set the same, and an identical SUS mesh-like sheet was used in each of Test Examples 1 to 9, but the number of rolls of the sheet was increased or decreased to change the heat capacity. Each mesh member M was formed to have a radial thickness of about 1 to 3 mm. Herein, the pressure-resistant container P was filled with 1,2-difluoroethylene (HFO-1132) as a refrigerant, and the refrigerant temperature was set to 150° C. while the refrigerant pressure was set to 1.5 MPa. The material, diameter D, and heat capacity of the mesh member M were changed and the ignition source S was caused to spark so that it was observed whether the resulting disproportionation reaction had propagated to a portion radially outward of the mesh member M. The test results are indicated below.

In the following table, "Post-Reaction State" indicates the results of visually observing the state of the mesh member M after the disproportionation reaction was caused to occur. "Temperature Rise (° C.) Outside Mesh Member" indicates the maximum temperature reached when the disproportionation reaction was caused to occur, and was measured using a temperature sensed with a temperature sensor disposed in the pressure-resistant container P and outside the mesh member M.

TABLE 1

| | Material of Mesh Member | Melting Point (° C.) of Mesh Member | Diameter (mm) of Mesh Member | Heat Capacity (J/K) of Mesh Member | Post-Reaction State | Temperature Rise (° C.) Outside Mesh Member |
|---|---|---|---|---|---|---|
| Test Example 1 | SUS | 1400 | 22 | 1.30 | Melted | 462 |
| Test Example 2 | SUS | 1400 | 13 | 0.65 | Melted | 249 |
| Test Example 3 | SUS | 1400 | 13 | 6.73 | Shape Maintained | 150 |
| Test Example 4 | SUS | 1400 | 13 | 1.91 | Partially Melted | 329 |
| Test Example 5 | SUS | 1400 | 30 | 4.40 | Partially Melted | 303 |
| Test Example 6 | SUS | 1400 | 13 | 3.83 | Partially Melted | 647 |
| Test Example 7 | SUS | 1400 | 30 | 7.42 | Shape Maintained | 150 |
| Test Example 8 | SUS | 1400 | 22 | 6.49 | Partially Melted | 506 |
| Test Example 9 | SUS | 1400 | 22 | 7.62 | Shape Maintained | 150 |
| Test Example 10 | Glass Fibers | 840 | 22 | 6.70 | Melted | 612 |

According to the foregoing test results, the mesh member M of Test Example 10, which was made of glass fibers with a melting point as low as 840° C., melted and disappeared when exposed to a high-temperature environment due to the occurrence of a disproportionation reaction. In Test Example 10, a temperature rise of the refrigerant was observed outside a portion where the mesh member M had existed, which demonstrates that it has been impossible to suppress the propagation of the disproportionation reaction.

For the mesh member M of each of Test Examples 1, 2, 4 to 6, and 8, which was made of SUS with a melting point as high as 1,400° C. but with an insufficient heat capacity of less than 6.5 J/K, a temperature rise of the refrigerant was observed outside the mesh member M, which demonstrates that it has been impossible to suppress the propagation of the disproportionation reaction. Specifically, the mesh member M of each of Test Examples 1 and 2 with an extremely low heat capacity of 0.65 to 1.30 J/K entirely melted. Meanwhile, the mesh member M of each of Test Examples 4 to 6 and 8 with a relatively low heat capacity of 1.91 to 6.49 J/K partially melted, and the generation of a hole radially penetrating the mesh member M was observed.

Meanwhile, the mesh member M of each of Test Examples 3, 7, and 9, which was made of SUS with a melting point as high as 1,400° C. and a heat capacity greater than or equal to 6.5 J/K, did not melt, and no temperature rise of the refrigerant was observed outside the mesh member M, which demonstrates that the propagation of the disproportionation reaction was suppressed.

When Test Examples 3 and 6 are compared, for example, both the mesh members M were made of SUS with a melting point of 1,400° C. and had a diameter of 13 mm. However, the propagation of a disproportionation reaction was not suppressed in Test Example 6, while the propagation of a disproportionation reaction was suppressed in Test Example 3 (this is also true of the relationship between Test Examples 9 and 1 and the relationship between Test Examples 7 and 5, for example). This demonstrates that the diameter of the mesh member M is not related to the suppression of the propagation of a disproportionation reaction.

Others

Though not limited, the device may include a movable portion and/or an electric portion.

Note that 1,2-difluoroethylene may be trans-1,2-difluoroethylene [(E)-HFO-1132], cis-1,2-difluoroethylene [(Z)-HFO-1132], or a mixture of them.

Supplement

Although the embodiments of the present disclosure have been described above, it is to be understood that various changes to the forms or details are possible without departing from the spirit or scope of the present disclosure recited in the claims.

CITATION LIST

Patent Literature

[Patent Literature 1] Japanese Patent Laid-Open No. 2019-196312

The invention claimed is:

1. A method comprising using a composition in a device, wherein:
the composition comprises one or more compounds selected from the group consisting of ethylene-based fluoroolefins, 2,3,3,3-tetrafluoropropene, and 1,3,3,3-tetrafluoropropene, and
a heat capacity of a portion with a melting point greater than or equal to 1,000° C. in the device is greater than or equal to 6.5 J/K.

2. The method according to claim 1, wherein the composition comprises one or more compounds selected from the group consisting of 1,2-difluoroethylene, 1,1-difluoroethylene, 1,1,2-trifluoroethylene, monofluoroethylene, and perhaloolefins.

3. The method according to claim 2, wherein the composition comprises 1,2-difluoroethylene or 1,1,2-trifluoroethylene.

4. A device for using a composition, the composition comprising one or more compounds selected from the group consisting of ethylene-based fluoroolefins, 2,3,3,3-tetrafluoropropene, and 1,3,3,3-tetrafluoropropene,
wherein:
a heat capacity of a portion with a melting point greater than or equal to 1,000° C. in the device is greater than or equal to 6.5 J/K.

5. A refrigeration cycle apparatus comprising a refrigerant circuit,
wherein the refrigerant circuit includes the device for using the composition as a refrigerant of claim 4, and a refrigerant pipe connected to the device.

* * * * *